United States Patent [19]

Weathersby et al.

[11] Patent Number: 4,803,770

[45] Date of Patent: Feb. 14, 1989

[54] PROCESS FOR REMOVING YARN OR FILM WRAPPED AROUND A TUBE

[75] Inventors: Charles C. Weathersby; Marcus C. Martin, Jr., both of Columbia, S.C.

[73] Assignee: Allied-Signal Inc., Morris Township, Morris County, N.J.

[21] Appl. No.: 414,209

[22] Filed: Sep. 2, 1982

[51] Int. Cl.[4] .............................................. B23P 19/02
[52] U.S. Cl. ..................................... 29/476.4; 72/402
[58] Field of Search ................... 29/426.4, 428, 234, 29/335, 728; 72/402, 403, 404; 28/292, 297, 298; 414/911; 242/1

[56] References Cited

U.S. PATENT DOCUMENTS

| | | | |
|---|---|---|---|
| 443,029 | 12/1890 | Wood | 72/402 |
| 1,070,379 | 8/1913 | Summey | 72/404 |
| 2,825,962 | 3/1958 | Brown et al. | 72/404 X |
| 3,089,230 | 5/1963 | Chapman et al. | 29/426.4 X |
| 3,210,984 | 10/1965 | Arbogast | 72/402 |
| 3,451,249 | 6/1969 | Sharon | 72/402 |
| 3,455,521 | 7/1969 | Cunningham et al. | 242/118.32 |

Primary Examiner—Timothy V. Eley

[57] ABSTRACT

Method and apparatus for removing yarn or film which is wrapped around a tube and forms a yarn package or film roll are provided. The method comprises, in sequence, the steps of applying a sufficient amount of pressure to the yarn package or film roll to cause the tube to pleat substantially along its length; releasing the pressure; and withdrawing the pleated tube from the package or roll. The apparatus comprises means for applying a sufficient amount of pressure to the yarn package or film roll to cause the tube to pleat substantially along its length; and means for releasing the pressure.

10 Claims, 4 Drawing Sheets

PROCESS FOR REMOVING YARN OR FILM WRAPPED AROUND A TUBE

BACKGROUND OF THE INVENTION

1. Field of the Invention

This invention relates to method and apparatus for removing yarn or film which is wrapped around a tube and forms a yarn package or film roll, quickly and safely, without degrading the yarn or film.

2. The Prior Art

During the manufacture of fibers and films from polymer, such as synthetic linear polyamides and polyester, less than first quality material is often produced. This material has generally wound onto a paper or cardboard tube or core, such as the Durolene spin-draw tube from the Sunoco Company, to form a full or partial package or roll during manufacture and prior to discovery of a processing problem or other reason for decreased product quality. In order to sell the product or regenerate polymer therefrom (see, e.g., U.S. Pat. No. 3,182,055 to Bonfield et al., hereby incorporated by reference), it may be necessary to remove it from the tube around which it is wrapped. This may be done manually with razor blades which is both slow and dangerous. Circular blade saws have been used; however, the friction-generated heat may fuse the cut yarn ends or film, which further devalues the product. Similarly, use of liquids to loosen the package or roll for removal of the tube may further devalue the product. The present invention permits quick and safe yarn or film removal from the tube without further degradation.

U.S. Pat. No. 2,646,342 to Vandenburgh discloses a method and apparatus for loosening regenerated cellulose yarn packages which lack an internal supporting core. The method comprises the simultaneous soaking and deformation of the yarn package.

U.S. Pat. No. 3,930,293 to Girard discloses a method of replacing the transfer cores of yarn packages with resilient replacement cores which may include the slight axial compression of the yarn package to loosen the grip of the yarn on the cardboard tube to permit easier mechanical withdrawal of the tube.

SUMMARY OF THE INVENTION

The present invention provides a method and apparatus for removing yarn which is wrapped around a tube and forms a yarn package, or film which is wrapped around a tube and forms a film roll.

The method comprises, in sequence, the steps of: applying a sufficient amount of pressure to a part of the yarn package or film roll to cause the tube to pleat substantially along its length; releasing the pressure; and withdrawing the pleated tube from the package or roll. It is preferred that the step of applying pressure comprises: applying a sufficient amount of pressure to a first part of the yarn package or film roll substantially along the length of the yarn package or film roll to depress the tube, followed by squeezing the yarn package or film roll sufficiently on each side of the first part to cause the depressed tube to pleat substantially along its length.

The apparatus comprises: means for applying a sufficient amount of pressure to a part of the yarn package or film roll to cause the tube to pleat substantially along its length; and means for releasing the pressure. The means for applying pressure preferably comprises, in combination, a ram; a squeezer; means for actuating the ram to apply a sufficient amount of pressure to a first part of the yarn package or film roll substantially along the length of the yarn package or film roll to depress the tube; and means for actuating the squeezer to squeeze the yarn package or film roll sufficiently on each side of the first part to cause the depressed tube to pleat substantially along its length.

It is preferred that the means for actuating the ram be a hydraulic system which comprises a first hydraulic cylinder with piston, the ram being attached to a first shaft which is displaced by the piston; hydraulic fluid; and pump means for pumping the hydraulic fluid to the first cylinder. The pump means, when activated, pumps hydraulic fluid to the first cylinder to displace the piston, and consequently the first shaft with attached ram, to cause the ram to apply the sufficient amount of pressure to the first part of the yarn package or film roll.

The means for actuating the squeezer preferably is a hydraulic system, also, comprising substantially opposed second and third hydraulic cylinders with pistons, the squeezer being attached to second and third shafts which are displaced by the pistons; hydraulic fluid; and pump means for pumping the hydraulic fluid to the second and third cylinders. The pump means, when activated, pumps hydraulic fluid to the second and third cylinders to displace their respective pistons, and consequently the second and third shafts with attached squeezer, to cause the squeezer to squeeze the yarn package or film roll on each side of the first part.

It is most preferred that both the means for actuating the ram and the means for actuating the squeezer be a unitary hydraulic system whereby a single pump means, when activated, (1) pumps hydraulic fluid to the first cylinder to displace the piston, and consequently the first shaft with attached ram, to cause the ram to apply the sufficient amount of pressure to the first part of the yarn package or film roll, and (2) pumps hydraulic fluid to the second and third cylinders to displace their respective pistons, and consequently the second and third shafts with attached squeezer, to cause the squeezer to squeeze the yarn package or film roll on each side of the first part.

It is also preferred that the means for releasing the pressure comprises the first, second and third cylinders with pistons, the hydraulic fluid and pump means, actuated to pump hydraulic fluid to the system in reverse.

The invention will be more clearly understood and additional objects and advantages will become apparent upon reference to the discussion below and to the drawings which are given for illustrative purposes.

BRIEF DESCRIPTION OF THE DRAWINGS

In the accompanying drawings.

DETAILED DESCRIPTION OF THE INVENTION

Figure 2:
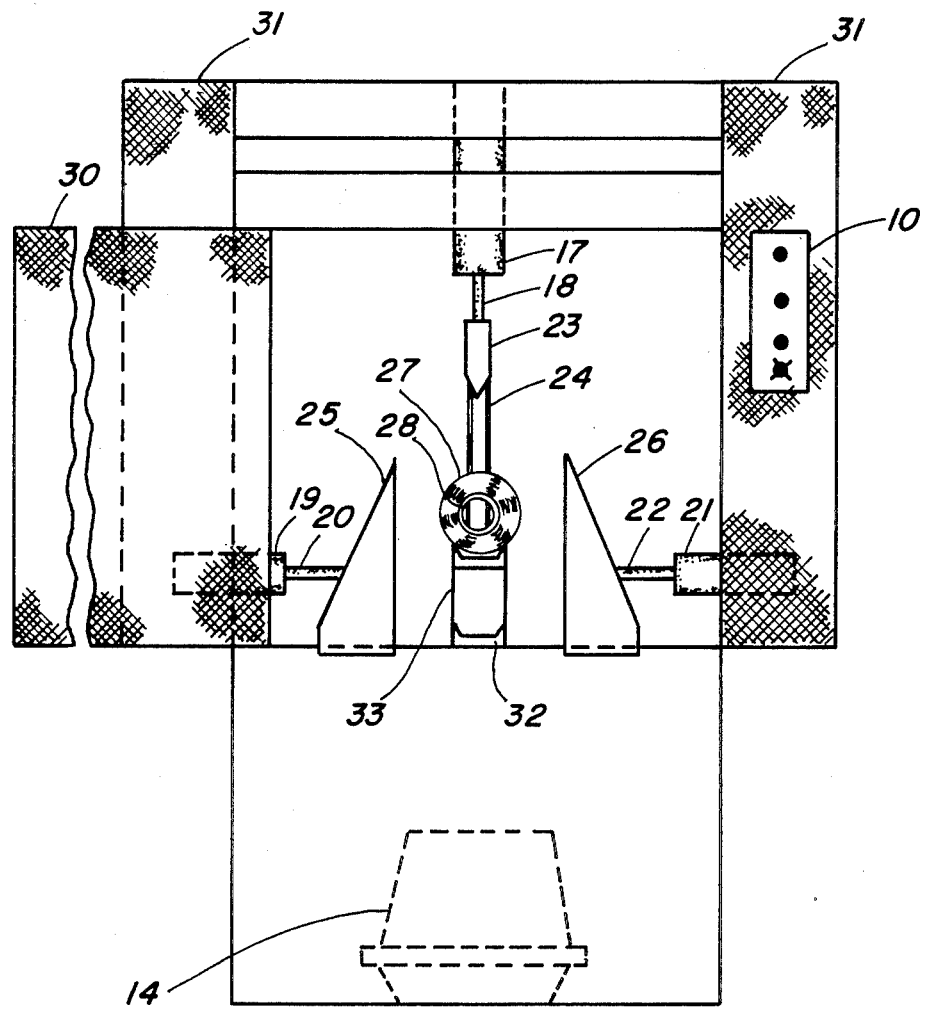
FIG. 2 is a front view of the apparatus of the present invention with a yarn package in place prior to operation.
Figure 2A:
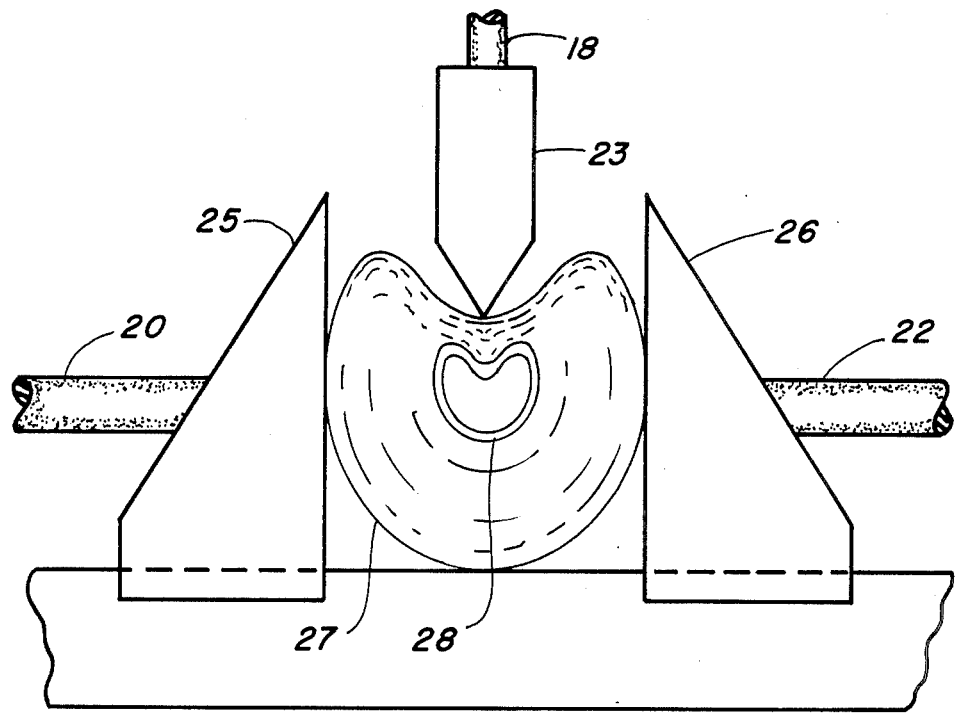
FIG. 2A is a partial front view of the apparatus with yarn package of FIG. 2 when the apparatus is operational.
Figure 2B:
FIG. 2B is a partial front view similar to FIG. 2A and depicting the apparatus and yarn package after operation.
Figure 2B:
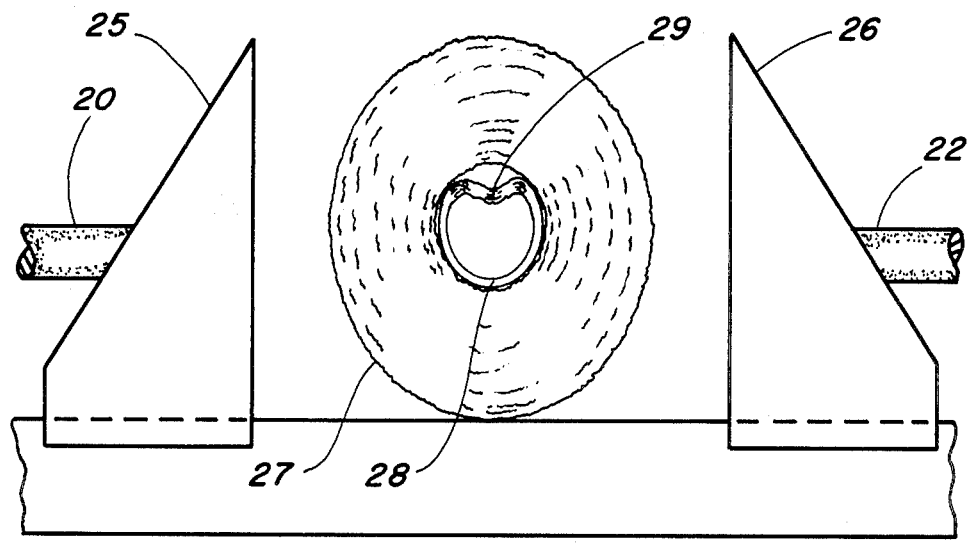

In the accompanying drawings, like numbers indicate like apparatus. With reference to FIG. 2, the apparatus for removing yarn which is wrapped around tube 28 and forms yarn package 27 comprises means for applying a sufficient amount of pressure to yarn package 27 to cause tube 28 to pleat substantially along its length (shown at 29 in FIG. 2B); and means for releasing the pressure. The means for applying pressure comprises, in combination, ram 23 attached by shaft 18 to first cylinder 17; a squeezer comprised of second 25 and third 26 rams attached by, respectively, shafts 20 and 22 to second and third cylinders 19 and 21; means for actuating ram 23 to apply a sufficient amount of pressure to a first part of yarn package 27 substantially along the length of package 27 to depress tube 28 (see FIG. 2A); and means for actuating second 25 and third 26 rams to squeeze yarn package 27 sufficiently on each side of the first part to cause the depressed tube 28 to pleat (29 in FIG. 2B) substantially along its length.

Figure 1:
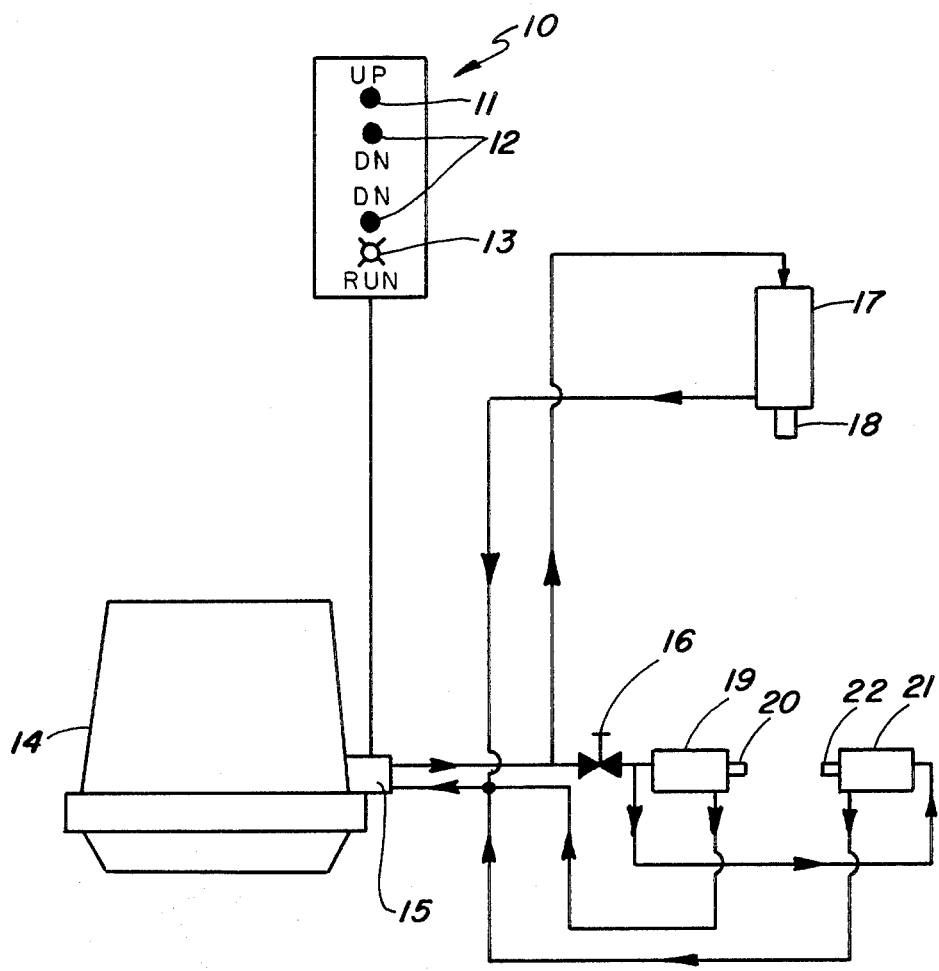
FIG. 1 is a schematic of a hydraulic system for use in the present invention.

As depicted in FIGS. 1 and 2, the preferred means for actuating ram 23 and the squeezer (rams 25 and 26) is a unitary hydraulic system whereby a single hydraulic pump 14, when activated electrically by pressing down buttons 12 of control panel 10, pumps hydraulic fluid through four-way valve 15 and hydraulic hose in the direction of the arrows (FIG. 1) to first cylinder 17 to displace its piston (unshown), and consequently, shaft 18 with attached ram 23, to cause ram 23 to drop. When the fluid in cylinder 17 arrives at a certain pressure [5000 psi (34,000 kPa) preferred], sequencing valve 16 opens to permit hydraulic fluid from pump 14 to go to second 19 and third 21 (side) cylinders. The operating pressure of second 19 and third 21 cylinders is preferably identical to that of first cylinder 17. As ram 23 drops to pleat tube 28, the pistons (unshown) of second 19 and third 21 cylinders displace, respectively, shafts 20 and 22 with attached rams 25 and 26 to cause them to squeeze yarn package 27 on each side of the first part to pleat tube 28. Tube 28 is fully pleated when pressure in the three cylinders, 17, 19 and 21, reaches equilibrium [preferably 5000 psi (34,000 kPa)]. Hydraulic pump 14 is adapted to shut off when the maximum safe hydraulic pressure has been reached. Cylinders 17, 19 and 21 are fully extended when tube 28 has been pleated. The up button 11 of control panel 10 is pressed to activate hydraulic pump 14 to pump hydraulic fluid through the system of FIG. 1 in reverse and cause retraction of rams 23, 25 and 26; this is the preferred means for releasing pressure.

Figures 3A, 3B:
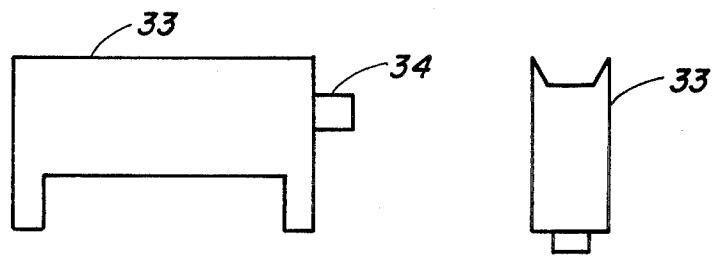
FIGS. 3A and 3B are, respectively, side and front views of an adaptor for small diameter yarn packages.
Figures 4A, 4B:
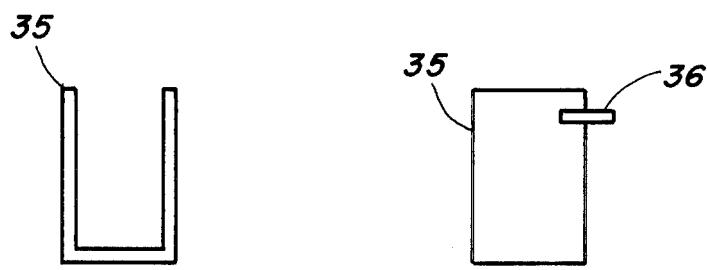
FIGS. 4A and 4B are, respectively, front and side views of an adaptor for short tubes 28.

With reference to FIG. 2, ram 23 is guided by grooved track 24. Bracket 32 (omitted in FIGS. 2A and 2B) holds and places yarn package 27 or receives adaptors 33 or 35, which are designed to accommodate variations in package 27 diameter and tube 28 lengths, respectively. FIGS. 3A and 3B show adaptor 33 for small diameter [less than about 8 inches (20 cm)] packages; adaptor 33 is placed on bracket 32 with peg 34 in grooved track 24, and yarn package 27 is placed on top of adaptor 33, as in FIG. 2. FIGS. 4A and 4B show adaptor 35 for short [6 inches (15 cm) or less in length] tubes; adaptor 35 is placed on bracket 32 with pegs 36 installed in drilled holes (unshown) provided adjacent grooved track 24. Yarn package 27 is placed on top of adaptor 32 and spaced from grooved track 24 by adaptor 35. If yarn package 27 has a small diameter and short tube 28, adaptor 33 is inserted, and adaptor 35 placed on top of adaptor 33 with pegs 36 installed in another pair of drilled holes (unshown) provided adjacent grooved track 24; yarn package 27 is placed on top of adaptor 33 and spaced from grooved track 24 by adaptor 35. If the difference in diameter is no greater than about 0.25 inch (0.64 cm), the two packages 27 with short tubes 28 may be handled at the same time; these tubes would be placed end to end on top of either bracket 32 or adaptor 33.

With reference to FIG. 2, guard panels 31 and sliding door 30 (shown in the open position) are provided as safety features. During normal operation, as in FIG. 2A, door 30 would be shut.

To operate the system, an operator slides door 30 to the left via a handle (unshown) to open. When door 30 is open, hydraulic pump 14 is off, and operating light 13 is off. The yarn package 27 to be taken apart is chosen and, if necessary, the appropriate adaptor 33 and/or 35 is inserted. Yarn package 27 is mounted with the transfer tail side away from grooved track 24 or adaptor 35. The operator slides door 30 to the right to close; when the door is shut it hits a relay switch (unshown), and operating light 12 comes on to indicate hydraulic pump 14 is operational. The two down buttons 12 are pressed until tube 28 has been pleated, as previously described. Hydraulic pump 14 will cut off automatically if pressure reaches 10,000 psi (69,000 kPa). After tube 28 has been pleated, buttons 12 are released and up button 11 is pressed to reverse the hydraulic system and cause hydraulic cylinders 17, 19 and 21 with, respectively, associated rams 23, 25 and 26 to completely retract. As door 30 is opened, light 13 on control panel 10 goes off. The operator may now remove the pleated tube 28 from yarn package 27, and both pleated tube 28 and the yarn may be discarded as desired.

The hydraulic system utilized the following parts: hydraulic pump 14—ENERPAC® PER-2041; hydraulic cylinder 17—ENERPAC® RD-910; hydraulic cylinders 19 and 21—ENERPAC® RD-96; pressure sequencing valve 16—ENERPAC® V-161; and hydraulic hose with couplers—ENERPAC® HC-913. (All available from Enerpac Division of Applied Power, Inc., Butler, Wis.)

Although a hydraulic system has been described in conjunction with presentation of the best mode, it is believed that an electrical or pneumatic system or hybrids thereof would work equally well.

We claim:

1. Apparatus for removing yarn which is wrapped around a tube and forms a yarn package, comprising:
    (a) means for applying a sufficient amount of pressure to a part of the yarn package to cause the tube to pleat substantially along its length;
    (b) means for releasing the pressure; and
    (c) means for withdrawing the pleated tube.

2. The apparatus of claim 1 wherein the means for applying pressure comprises, in combination:
    (a) a ram;
    (b) a squeezer;
    (c) means for actuating the ram to apply a sufficient amount of pressure to a first part of the yarn package substantially along the length of the yarn package to depress the tube; and
    (d) means for actuating the squeezer to squeeze the yarn package sufficiently on each side of the first part to cause the depressed tube to pleat substantially along its length.

3. The apparatus of claim 4 wherein the means for actuating the ram and the means for actuating the squeezer are a hydraulic system comprising:
 (a) a first hydraulic cylinder with piston, the ram being attached to a first shaft which is displaced by the piston;
 (b) substantially opposed second and third hydraulic cylinders with pistons, the squeezer being attached to second and third shafts which are displaced by the pistons;
 (c) a hydraulic fluid; and
 (d) pump means for pumping the hydraulic fluid to the first, second and third cylinders;
whereby the pump means, when activated, pumps hydraulic fluid to the first cylinder to displace the piston, and consquently the first shaft with attached ram, to cause the ram to apply the sufficient amount of pressure to the first part of the yarn package, and pumps hydraulic fluid to the second and third cylinders to displace their respective pistons, and consequently the second and third shafts with attached squeezer, to cause the squeezer to squeeze the yarn package on each side of the first part.

4. The apparatus of claim 3 wherein the means for releasing the pressure comprises the first, second and third cylinders with pistons, the hydraulic fluid and pump means, actuated to pump hydraulic fluid to the system in reverse.

5. The apparatus of claim 2 wherein the means for actuating the ram is a hydraulic system comprising: a first hydraulic cylinder with piston, the ram being attached to a first shaft which is diplaced by the piston; a hydraulic fluid; and pump means for pumping the hydraulic fluid to the first cylinder;
whereby the pump means, when activated, pumps hydraulic fluid to the first cylinder to displace the piston, and consequently the first shaft with attached ram, to cause the ram to apply the sufficient amount of pressure to the first part of the yarn package.

6. The apparatus of claim 2 wherein the means for actuating the squeezer is a hydraulic system comprising: substantially opposed second and third hydraulic cylinders with pistons, the squeezer being attached to second and third shafts which are displaced by the pistons; a hydraulic fluid; and pump means for pumping the hydraulic fluid to the second and third cylinders;
whereby the pump means, when activated, pumps hydraulic fluid to the second and third cylinders to displace their respective pistons, and consequently the second and third shafts with attached squeezer, to cause the squeezer to squeeze the yarn package on each side of the first part.

7. Apparatus for removing film which is wrapped around a tube and forms a film roll, comprising:
 (a) means for applying a sufficient amount of pressure to the film roll to cause the tube to pleat substantially along its length;
 (b) means for releasing the pressure; and
 (c) means for withdrawing the pleated tube.

8. The apparatus of claim 7 wherein the means for applying pressure comprises, in combination:
 (a) a ram;
 (b) a squeezer;
 (c) means for actuating a ram to apply a sufficient amount of pressure to a first part of the film roll substantially along the length of the film roll to depress the tube; and
 (d) means for actuating the squeezer to squeeze the film roll sufficiently on each side of the first part to cause the depressed tube to pleat substantially along its length.

9. The apparatus of claim 8 wherein the means for actuating the ram and the means for actuating the squeezer are a hydraulic system comprising:
 (a) a first hydraulic cylinder with piston, the ram being attached to a first shaft which is displaced by the piston;
 (b) substantially opposed second and third hydraulic cylinders with pistons, the squeezer being attached to second and third shafts which are displaced by the pistons;
 (c) a hydraulic fluid; and
 (d) pumping means for pumping the hydraulic fluid to the first, second and third cylinders;
whereby the pump means, when activated, pumps hydraulic fluid to the first cylinder to displace the piston, and consequently the first shaft with attached ram, to cause the ram to apply the sufficient amount of pressure to the first part of the film roll, and pumps hydraulic fluid to the second and third cylinders to displace their respective pistons, and consequently the second and third shafts with attached squeezer, to cause the squeezer to squeeze the film roll on each side of the first part.

10. The apparatus of claim 9 wherein the means for releasing the pressure comprises the first, second and third cylinders with pistons, the hydraulic fluid and pump means, actuated to pump hydraulic fluid to the system in reverse.

* * * * *

UNITED STATES PATENT AND TRADEMARK OFFICE
CERTIFICATE OF CORRECTION

PATENT NO. : 4,803,770
DATED : February 14, 1989
INVENTOR(S) : Charles C. Weathersby and Marcus C. Martin, Jr.

It is certified that error appears in the above-identified patent and that said Letters Patent is hereby corrected as shown below:

Col. 5, line 1, Claim 3 is amended to depend from claim 2.

Signed and Sealed this

Twentieth Day of June, 1989

Attest:

DONALD J. QUIGG

*Attesting Officer*   *Commissioner of Patents and Trademarks*